Patented June 6, 1933

1,912,469

UNITED STATES PATENT OFFICE

ROBERT ERWIN WINDECKER, OF PAINESVILLE, OHIO

MANUFACTURE OF MAGNESIUM CHLORIDE

No Drawing.  Application filed August 8, 1930. Serial No. 474,063.

This invention relates to a process consisting of two parts, the first being the distilling of a known quantity of ammonium chloride liquor with calcined dolomite, the reaction taking place to the extent that approximately all the calcium oxide present is converted to calcium chloride and approximately all the ammonium chloride in the liquor is decomposed to free ammonia, the products of reaction being free ammonia which is distilled off, calcium chloride, magnesium oxide and impurities found in ordinary dolomites. The sludge from this reaction may then be filtered or decanted to separate the magnesium oxide from the liquor containing calcium chloride.

The second step of this process consists of the reaction between the magnesium oxide and known quantities of liquor containing ammonium chloride. This reaction is accomplished in a conventional ammonia still and the raw materials so proportioned that approximately all the magnesium oxide is converted to magnesium chloride and approximately all the ammonium chloride decomposed to free ammonia. The free ammonia is distilled off and the liquor containing magnesium chloride filtered from insoluble impurities and purified by crystallization.

The manufacture of magnesium chloride in accordance with the invention will be illustrated by the following example:

500 parts calcined dolomite containing approximately 270 parts calcium oxide and 180 parts magnesium oxide are distilled with a liquor containing 540–560 parts ammonium chloride until approximately all the ammonium chloride present has been decomposed and the free ammonia distilled off. The resulting sludge, freed from liquor containing calcium chloride by filtration or decantation, containing about 170–180 parts magnesium oxide, is distilled with a liquor containing about 360–390 parts ammonium chloride, until approximately all the ammonium chloride is decomposed and the free ammonia distilled off. The resulting sludge is filtered or decanted off and the liquor containing magnesium chloride evaporated and treated to produce crystallized magnesium chloride.

It is evident that in the example above the ammonium chloride is added in excess in the first step of the reaction in order that in a commercial operation essentially all the calcium oxide will be decomposed, and in so doing a slight amount of magnesium oxide is decomposed.

It will be understood that the foregoing example is intended merely to illustrate the invention and that the invention is not limited specifically thereto. The proportions of the raw materials may be varied, for example, a larger quantity of ammonium chloride may be added during the first part of the process, thereby producing a small amount of magnesium chloride along with the calcium chloride.

The invention is not limited to the use of ordinary dolomites but includes also oxides of magnesium and calcium found as carbonates, where the calcium content is low and magnesium high, or where magnesium content is low and calcium high. It also includes mixtures of these oxides or hydrates produced as a product of manufacture.

The invention includes the processing of these materials by either continuous or batch distillations.

The products of reaction of this process, according to the invention, are, in the first part, mainly ammonia, magnesium oxide and liquors containing calcium chloride, with impurities such as sodium chloride and possibly magnesium chloride, depending upon the content of the raw liquors and upon the proportions used. The ammonia, according to the invention, will be recovered and the calcium and sodium chlorides may or may not be recovered.

The products of reaction of this process, according to the invention, are, in the second part, mainly ammonia and liquor containing magnesium chloride and possibly such impurities as calcium chloride, silica, sodium chloride and others, depending upon the content of the raw liquors used and upon the content and variation of proportions of the raw materials used.

I claim:

1. The process for manufacturing magnesium chloride from dolomite comprising treating calcined dolomite with ammonium chloride liquor in small excess over the theoretical quantity necessary to convert all the calcium oxide to calcium chloride, filtering, and treating by distillation the precipitate with ammonium chloride liquor to convert the magnesium oxide of the precipitate to magnesium chloride which after filtration from residues produces substantially pure magnesium chloride.

2. A process of manufacturing magnesium chloride from dolomite, comprising treating calcined dolomite with approximately the quantity of ammonium chloride liquor necessary to convert the calcium oxide present in the calcined dolomite to calcium chloride, filtering, and treating the precipitate by distillation with ammonium chloride liquor to obtain substantially pure magnesium chloride.

3. The process of obtaining magnesium chloride from dolomite comprising treating by distillation calcined dolomite with about a sufficient quantity of ammonium chloride liquor to convert the calcium oxide present to calcium chloride, separating the soluble salts from the insoluble and treating the insoluble by distillation with ammonium chloride liquor to produce magnesium chloride liquor which is further purified by filtering off unreacted material and by crystallization.

4. A process for manufacturing magnesium chloride from dolomite comprising treating by distillation 500 parts by weight of calcined dolomite containing about 170–180 parts of magnesium oxide with ammonium chloride liquor containing about 560–540 parts of ammonium chloride, separating the soluble salts from the precipitate and treating the precipitate by distillation with ammonium chloride liquor containing about 360–390 parts of ammonium chloride to produce magnesium chloride.

In testimony thereof I have hereunto set my hand.

ROBERT ERWIN WINDECKER.